United States Patent
Wang et al.

(10) Patent No.: US 10,929,013 B2
(45) Date of Patent: Feb. 23, 2021

(54) METHOD FOR ADJUSTING INPUT VIRTUAL KEYBOARD AND INPUT APPARATUS

(71) Applicant: BEIJING SOGOU TECHNOLOGY DEVELOPMENT CO., LTD., Beijing (CN)

(72) Inventors: Xiaofei Wang, Beijing (CN); Min Liu, Beijing (CN); Conghui Du, Beijing (CN); Lei Yang, Beijing (CN); Liping Li, Beijing (CN)

(73) Assignee: BEIJING SOGOU TECHNOLOGY DEVELOPMENT CO., LTD., Beijing (CN)

( * ) Notice: Subject to any disclaimer, the term of this patent is extended or adjusted under 35 U.S.C. 154(b) by 88 days.

(21) Appl. No.: 15/507,035

(22) PCT Filed: Aug. 14, 2015

(86) PCT No.: PCT/CN2015/087064
§ 371 (c)(1),
(2) Date: Feb. 27, 2017

(87) PCT Pub. No.: WO2016/041425
PCT Pub. Date: Mar. 24, 2016

(65) Prior Publication Data
US 2017/0300227 A1    Oct. 19, 2017

(30) Foreign Application Priority Data
Sep. 17, 2014 (CN) .......................... 2014 1 0475448

(51) Int. Cl.
*G06F 3/0488* (2013.01)
*G06F 3/023* (2006.01)
(Continued)

(52) U.S. Cl.
CPC ........ *G06F 3/04886* (2013.01); *G06F 3/0233* (2013.01); *G06F 3/0236* (2013.01);
(Continued)

(58) Field of Classification Search
CPC .................................................. G06F 3/04886
See application file for complete search history.

(56) References Cited

U.S. PATENT DOCUMENTS 5,515,495 A * 5/1996 Ikemoto .............. G06F 3/04817
715/835
6,359,572 B1 * 3/2002 Vale ...................... G06F 3/0237
341/22
(Continued)

FOREIGN PATENT DOCUMENTS

| CN | 101710269 A | 5/2010 |
| CN | 102117164 A | 7/2011 |

(Continued)

OTHER PUBLICATIONS

The World Intellectual Property Organization (WIPO) International Search Report for PCT/CN2015/087064 dated Nov. 19, 2015 5 Pages.

*Primary Examiner* — Scott T Baderman
*Assistant Examiner* — Benjamin Smith
(74) *Attorney, Agent, or Firm* — Anova Law Group, PLLC

(57) ABSTRACT

The present disclosure provides a method for adjusting an input virtual keyboard and an input apparatus, which are directed to solve the problem of one-hand operation in existing input virtual keyboards. The method comprises: based on a received keyboard floating instruction: adjusting a size of an input window to a screen size; intercepting a click event performed on a touchscreen by a user and detecting the click event; and when the click event is detected as a keyboard adjustment instruction, based on the
(Continued)

keyboard adjustment instruction, adjusting at least one of a drawing position and a drawing size of an input view, wherein the input view is a region for drawing the input virtual keyboard in the input window.

15 Claims, 7 Drawing Sheets

(51) Int. Cl.
*G06F 3/0484* (2013.01)
*G06F 3/0481* (2013.01)

(52) U.S. Cl.
CPC ......... *G06F 3/0481* (2013.01); *G06F 3/0484* (2013.01); *G06F 3/04845* (2013.01)

(56) References Cited

U.S. PATENT DOCUMENTS

| | | | | |
|---|---|---|---|---|
| 6,834,388 | B1* | 12/2004 | Elsbree | G05B 19/0426 719/315 |
| 7,584,429 | B2 | 9/2009 | Fabritius | G06F 3/038 345/156 |
| 9,298,474 | B2* | 3/2016 | Bauchot | G06F 9/451 |
| 10,437,409 | B2* | 10/2019 | Bauchot | G06F 3/0481 |
| 2002/0105504 | A1* | 8/2002 | Toepke | G06F 3/0238 345/173 |
| 2003/0197687 | A1* | 10/2003 | Shetter | G06F 3/04886 345/173 |
| 2004/0183834 | A1* | 9/2004 | Chermesino | G06F 3/04886 715/773 |
| 2006/0075359 | A1* | 4/2006 | Bauchot | G06F 9/451 715/790 |
| 2007/0247442 | A1* | 10/2007 | Andre | G06F 3/04883 345/173 |
| 2008/0008439 | A1* | 1/2008 | Liu | H04N 21/458 386/248 |
| 2009/0031237 | A1* | 1/2009 | Jessen | G06F 3/0481 715/768 |
| 2009/0225035 | A1* | 9/2009 | Baik | G06F 3/04886 345/173 |
| 2010/0141590 | A1* | 6/2010 | Markiewicz | G06F 3/0488 345/173 |
| 2010/0323762 | A1* | 12/2010 | Sindhu | G06F 1/1613 455/566 |
| 2012/0075192 | A1* | 3/2012 | Marsden | G06F 3/04886 345/168 |
| 2012/0113007 | A1* | 5/2012 | Koch | G06F 3/0488 345/168 |
| 2012/0117506 | A1* | 5/2012 | Koch | G06F 3/04886 715/773 |
| 2012/0274574 | A1* | 11/2012 | Aono | G06F 3/0488 345/173 |
| 2013/0104065 | A1* | 4/2013 | Stecher | G06F 3/0481 715/767 |
| 2013/0179845 | A1* | 7/2013 | Bok | G06F 3/04886 715/863 |
| 2013/0234949 | A1* | 9/2013 | Chornenky | G06F 3/0216 345/169 |
| 2013/0311929 | A1* | 11/2013 | Hughes | G06F 3/04817 715/773 |
| 2014/0071054 | A1 | 3/2014 | Koch et al. | |
| 2014/0157161 | A1* | 6/2014 | Hunt | G06F 3/04847 715/768 |
| 2014/0164975 | A1* | 6/2014 | Kang | G06F 3/04845 715/773 |
| 2014/0237412 | A1* | 8/2014 | Yoon | G06F 3/04886 715/773 |
| 2014/0320411 | A1* | 10/2014 | Kuzmin | G06F 3/04886 345/168 |
| 2014/0337786 | A1* | 11/2014 | Luo | G06F 3/0416 715/773 |
| 2015/0057048 | A1* | 2/2015 | Wang | H04M 3/44 455/564 |
| 2015/0091891 | A1* | 4/2015 | Raheman | A63G 31/16 345/419 |
| 2015/0128080 | A1* | 5/2015 | Liu | G06F 3/04886 715/768 |
| 2015/0143285 | A1* | 5/2015 | Wei | G06F 3/04842 715/799 |
| 2015/0212730 | A1* | 7/2015 | Liu | G06F 3/0488 715/800 |
| 2015/0324080 | A1* | 11/2015 | Jin | G06F 3/0485 715/784 |
| 2016/0224352 | A1* | 8/2016 | Bauchot | G06F 9/451 |
| 2016/0259548 | A1* | 9/2016 | Ma | G06F 3/04886 |
| 2016/0370864 | A1* | 12/2016 | Choi | G06F 3/0488 |
| 2017/0004126 | A1* | 1/2017 | Li | G06F 3/0482 |
| 2017/0359280 | A1* | 12/2017 | Zhang | H04L 51/046 |
| 2019/0361571 | A1* | 11/2019 | Bauchot | G06F 9/451 |

FOREIGN PATENT DOCUMENTS

| | | |
|---|---|---|
| CN | 102214069 A | 10/2011 |
| CN | 102362254 A | 2/2012 |
| CN | 104281385 A | 1/2015 |

* cited by examiner

METHOD FOR ADJUSTING INPUT VIRTUAL KEYBOARD AND INPUT APPARATUS

CROSS-REFERENCES TO RELATED APPLICATIONS

This application is a national stage patent application of PCT application No. PCT/CN2015/087064, filed on Aug. 14, 2015, which claims priority to Chinese Patent Application No. 201410475448.9, filed with the State Intellectual Property Office of People's Republic of China on Sep. 17, 2014, entitled "METHOD FOR ADJUSTING INPUT VIRTUAL KEYBOARD AND INPUT APPARATUS", the entire content of ail of which is incorporated herein by reference.

FIELD OF THE DISCLOSURE

The present disclosure relates to the field of input technologies, and more specifically, relates to a method for adjusting an input virtual keyboard and an input apparatus.

BACKGROUND

Recently, with a rapid growth of touchscreen mobile terminals, input methods have also been rapidly developed. By utilizing an input method, users are able to operate the virtual keyboard on the touchscreen by fingers, thereby enabling a rapid input. Thus, input methods are very important to the touchscreen mobile terminals and their applications.

As the technologies of terminal instruments advance, the screen size of the touchscreen is becoming larger and larger, which is more suitable for browsing webs, and watching videos, etc. More and more mobile phones and other mobile terminals are equipped with a 6-inch and above screen, while other touchscreen terminals, such as flat panels, smart TVs, have a screen size much larger than 6 inches.

However, the touchscreen terminal with a large-sized screen increases the difficulty of the one-handed operation and, moreover, even some daily operations may become extremely difficult. For example, when entering a text on a large-sized screen, because the distance between each key in the input virtual keyboard is substantially large, one-hand operation may be difficult to be realized.

Certain input virtual keyboard may be provided with a size adjustment function, however, due to the system limitations of the terminal, the virtual keyboard may only be located in the lower part of the screen. Thus, only the upper side of the virtual keyboard may be adjusted, while the other sides of the virtual keyboard may not be adjusted. Moreover, the size adjustment may also have a certain limitation and, thus, one-hand operation may still be difficult to be realized even after the size adjustment.

BRIEF SUMMARY OF THE DISCLOSURE

The technical problem to be solved by the present disclosure is to provide a method for adjusting an input virtual keyboard, which is directed to solve the problem of one-hand operation in an existing input virtual keyboard.

Further, the present disclosure also provides an input apparatus for realizing the implementation and application of the method for adjusting an input virtual keyboard.

To solve one or more problems set forth above, the present disclosure provides a method for adjusting an input virtual keyboard, comprising: based on a received keyboard floating instruction, adjusting a size of an input window to a screen size; intercepting a click event performed on a touchscreen by a user and detecting the click event; and when the click event is detected as a keyboard adjustment instruction, based on the keyboard adjustment instruction, adjusting at least one of a drawing position and a drawing size of as input view, wherein the input view is a region for drawing the input virtual keyboard in the input window.

The present disclosure also provides an input apparatus, comprising: a floating keyboard activation module, configured to, based on a received keyboard floating instruction, adjust a size of an input window to a screen size; an event detection and dispatch module, configured to intercept a click event performed on a touchscreen by a user and detect the click event; and a floating keyboard adjustment module, configured to, when the click event is detected as a keyboard adjustment instruction, based on the keyboard adjustment instruction, adjust at least one of a drawing position and a drawing size of an input, view, wherein the input view is a region for drawing the input virtual keyboard in the input window.

The present disclosure also provides a program comprising a readable code, when the readable code is run on a computing device, the computing device executes a method for adjusting an input virtual keyboard according to any one of the embodiments provided in the present disclosure.

The present disclosure also provides a readable medium storing the above-mentioned program.

Compared to the existing technologies, the disclosed embodiments have the following advantages.

Based on a received keyboard floating instruction, the size of the input window is adjusted to the screen size. Because the entire screen region is the input window, the input view for drawing the virtual keyboard floats in the input window, and the position and size of the input view can be adjusted as desired, thereby facilitating one-hand operation by the user, realizing the rapid input, and improving the input efficiency.

DETAILED DESCRIPTION

To make the objective, technical solutions and advantages of the present disclosure more clear, the technical solutions of the embodiments of the present disclosure will be described below with reference to the accompanying drawings.

One of the core ideas of the present disclosure is a method for adjusting an input virtual keyboard, which is directed to solve the problem of one-hand operation in an existing input virtual keyboard. In the disclosed embodiments, based on a received keyboard floating institution, the size of an input window may be adjusted so a screen size. Because the entire screen region is the input window, the input view for drawing the virtual keyboard may float in the input window, and the position and size of the input view may be adjusted as desired. That is, the position and size of the input view may be adjusted based on the keyboard adjustment instruction, thereby facilitating one-hand operation by the user, realizing the rapid input, and improving the input efficiency.

First Embodiment

Figure 1:
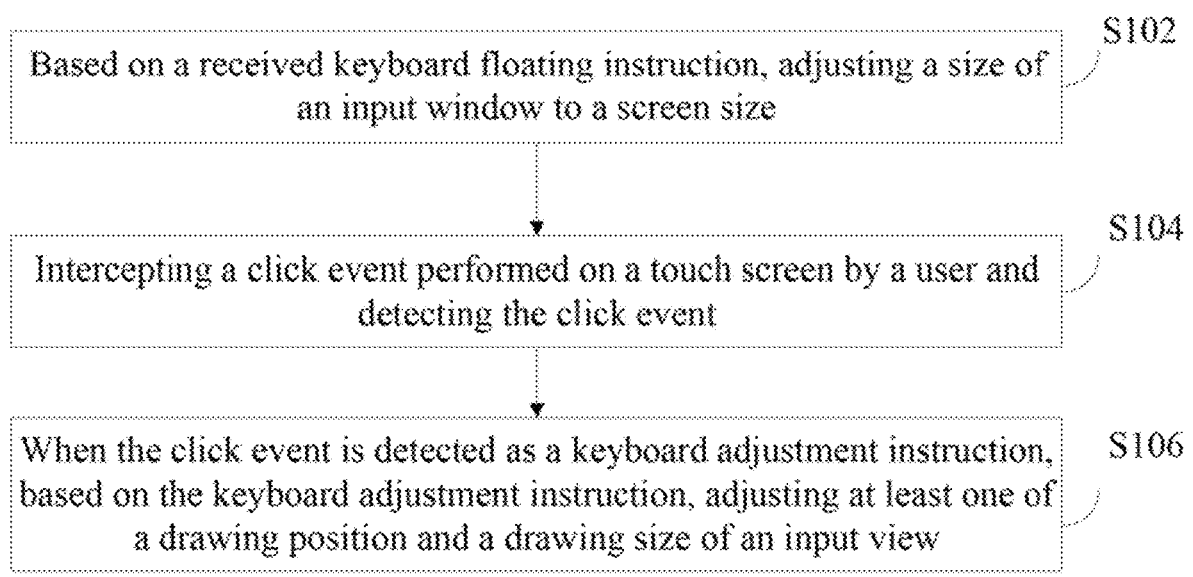
FIG. 1 illustrates a flow chart of an exemplary method for adjusting an input virtual keyboard consistent with disclosed embodiments.

FIG. 1 illustrates a flow chart of an exemplary method for adjusting an input virtual keyboard consistent with disclosed embodiments. The method may comprise the following steps.

Step S102, based on a received keyboard floating instruction, adjusting a size of an input window to a screen size.

When operating a mobile phone, a tablet and other terminals, the user often adopts a virtual keyboard as an input method on the touchscreen. However, sometimes the screen is large and, thus, it may be difficult for the user to operate by one hand. Meanwhile, the distance between the keypad area in the virtual keyboard and the buttons in the toolbar may be substantially large, such that the input efficiency may be affected.

In the disclosed embodiments, the virtual keyboard may be adjusted to facilitate the user's input. When the user is utilizing the input method, the keyboard floating instruction may be sent through the tool bar, and a shortcut, etc., to trigger a floating keyboard mode, for example, dragging the keyboard upwards to trigger the floating keyboard mode. In particular, after the input method is activated, an input window may be created in the display area of the current screen, and a virtual keyboard may be drawn in the input window. The area for drawing the virtual keyboard in the input window may be called as an input view.

After receiving the keyboard floating instruction, the input window may be switched from the normal mode to the floating keyboard mode. At this moment, the input window and the input view may be separated, so as to adjust the input view in the input window as desired. The size of the input window may be adjusted to the screen size, such that the input window may fill the entire screen of the terminal. In one embodiment, to prevent the operation of other applications from being affected, the background color of the input window may be adjusted to be transparent given the input window has a background color. Meanwhile, the input window may be configured to be located at the top of all window, i.e., the top layer of the current display window, such that the input view may be floating in the input window.

That is, the virtual keyboard (input view) may exhibit a floating effect in which the virtual keyboard (input view) may be floating above the other windows, allowing the user to adjust the floating virtual keyboard to facilitate one-hand operation. Moreover, after the input window and the input view are separated, the input window may fill the entire screen and thus, the input view may be drawn in the input window, and the position and size of the input view may be adjusted as desired.

When the input window has a background color and the background color of the input window is adjusted to be transparent, even when the current input window fills the entire screen, the user may not be disturbed. For example, the user may still be able to see other running applications as well as the input virtual keyboard in the display area of the screen of the terminal.

Step S104, intercepting a click event performed on a touchscreen by a user, and detecting the click event.

When the current input window fills the entire screen, the user may still be able to see other running applications as well as the input virtual keyboard, thus an operation performed by the user on the touchscreen of the terminal may be for the virtual keyboard or another application. Thus, the click event performed on the touchscreen by the user may haven to be intercepted and received by the input method first, then detected and dispatched.

When the click event is detected to be for another application, the click event may be dispatched to the corresponding application. When the click event is detected to be for the input method, the click event may be dispatched to the input window, which may perform the corresponding operation, such as inputting text, and adjusting the input view, etc.

Step S106, when the click event is detected as a keyboard adjustment instruction, based on the keyboard adjustment instruction, adjusting a drawing position and a drawing size of an input view.

For a click event dispatched to the input window, the click event may be further detected to determine a current operation. To facilitate the user's input by the use the input method, after the input method enters the floating keyboard mode, because the entire screen is the input window, the size and location of the input view may be adjusted as desired within the input widow. That is, the user may be able to draw the virtual keyboard as desired within the input window. To further facilitate the user's input, the user may continue to adjust the virtual keyboard according to his/her requirements. At this moment, the click event may be interpreted as the keyboard adjustment instruction.

Based on the keyboard adjustment instruction, the input view may be adjusted, i.e., at least one of the drawing position and the drawing size of the input view may be adjusted, thereby adjusting the position and size of the input virtual keyboard as desired within the screen. For example, the drawing position of the input view may be adjusted according to a swiping path of the click event, such that the virtual keyboard may float in the screen following the swiping path of the click event; or the drawing position of the input view may be adjusted according to the corresponding operation of the click event, thereby facilitating the operation of the user, realizing the rapid input, and improving the input efficiency.

In summary, according to the received keyboard floating instruction, the size of an input window may be adjusted to the screen size. Because the entire screen region is the input window, the input view for drawing the virtual keyboard may float in the input window, and the position and size of the input view may be adjusted as desired. That is, the position and size of the input view may be adjusted based on the keyboard adjustment instruction, thereby facilitating one-hand operation by the user, realizing the rapid input, and improving the input efficiency.

Second Embodiment

Based on the above-described embodiment, a method for adjusting the input virtual keyboard will be described.

Figure 2:
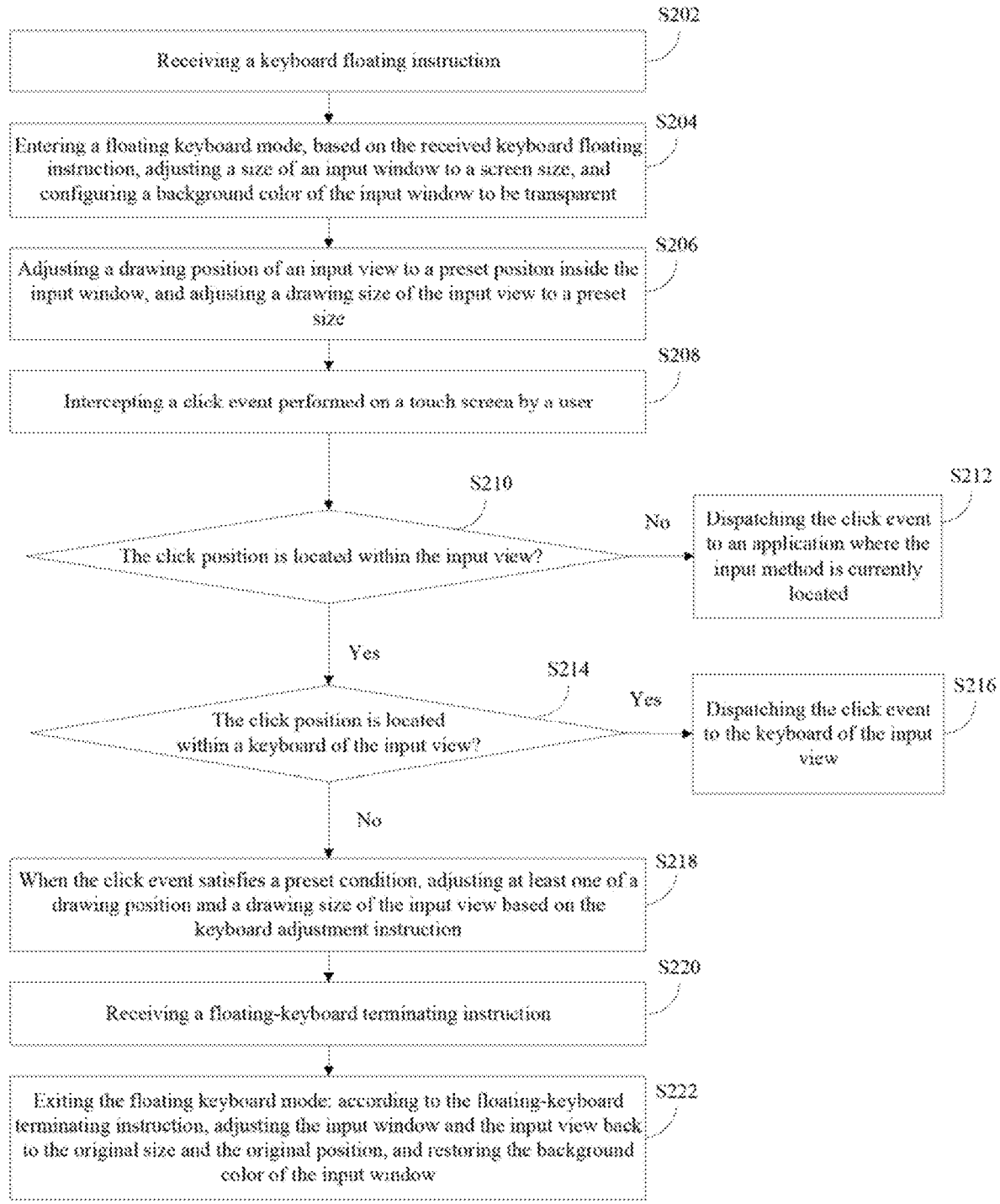
FIG. 2 illustrates a flow chart of another exemplary method for adjusting an input virtual keyboard consistent with disclosed embodiments.

FIG. 2 illustrates a flow chart of another exemplary method for adjusting an input virtual keyboard consistent with disclosed embodiments. The method may comprise the following steps.

Step S202, receiving a keyboard floating instruction.

Step S204, entering a floating keyboard mode: based on the received keyboard floating instruction, adjusting a size of an input window to a screen size, and configuring a background color of the input window to be transparent.

Step S206, adjusting a drawing position of an input view to a preset position in the input window, and adjusting a drawing size of the input view to a preset size.

When using an input method on the touchscreen device, the user may send the keyboard floating instruction to configure the input method to enter the floating keyboard mode, such that the position and size of the floating keyboard in the touchscreen device may be adjusted to facilitate the user's input.

The input window may be able to receive the keyboard floating instruction, based on which the floating keyboard mode may be started. In particular, the user may utilize the input method when running other applications. In the normal mode, the input window of the input method may be configured to be at the lower part of the current display window, while the current other application programs may be configured to be at the upper part of the current display window. After the floating keyboard mode is started, the input window may be changed from being disposed at the lower part of the current display window to the top layer of the current window. Meanwhile, the size of the input window may be adjusted to be the screen size, such that the input window may fill the entire screen. The background color of the input window may be adjusted to be transparent. The input window may be configured to no longer receive events, such that the display of the other current applications may not be affected, i.e., the user may not be disturbed.

Moreover, the input view may be re-drawn, i.e., the input view (i.e., the virtual keyboard) may be adjusted. For example, in the floating keyboard mode, the preset position and preset size of the input view in the input window may be pre-determined. Thus, after starting the floating keyboard mode and adjusting the input window, the size of the input view may be adjusted from the original size in the normal mode to the preset size, and the position of the input view may be moved from the original position in the normal mode to the preset position, such as the middle of the touchscreen. The drawing of the input view may be controlled, thereby realizing the subsequent size and position adjustments of the input view.

After entering the floating keyboard mode, the virtual keyboard may float in the input window, and the position and size of the virtual keyboard may be released, such that the user may drag the virtual keyboard as desired to adjust the size and position. Moreover, in the floating keyboard mode, after the virtual keyboard is floating, the floating keyboard mode may also have many other properties, for example, N number of areas for inputting may be drawn in the input window.

Step S208, intercepting a click event performed on a touchscreen by a user.

Step S210, acquiring position information of a click in the click event, and detecting whether the click position is located within the input view.

After entering the floating keyboard mode, because when the input window fills the entire screen, the operation performed by the user on the screen may be all performed on the input window. However, it is possible that such an operation may be for another application. Thus, the input window may be configured to no longer receive events, instead, an event dispatcher may be adopted to intercept the click event performed on the touchscreen by the user, detect the click event, and dispatch the click event according to the detection result.

For example, when using the input method in WeChat or Short Message Service (SMS) and starting the floating keyboard mode, it may still seem to be WeChat and the virtual keyboard (floating keyboard) to the user, however, in fact the entire screen may be the input window. Then the user may click to view an image in WeChat, however, in fact the click event may be intercepted by the input window, and the input window may determine which application the operation is for and dispatch the operation to the corresponding application.

Further, the position information of the click in the click event, i.e., the position clicked or touched by the user on the screen, may be acquired. The click position may be detected to determine whether the click position is located within the input view, for example, the click position may be represented by coordinates, then whether the coordinates fall within the input view may be detected.

When the click position is detected to be located within the input view, Step S214 will be performed. When the click position, is detected to be located beyond the input view, Step S212 will be performed.

Step S212, dispatching the click event to an application where the input method is currently embedded.

When the information of the click position is detected to be located beyond the input view, the click event may not be aimed at the input method. Accordingly, the click event may be dispatched to the application where the input method is currently embedded, and the application may perform the corresponding operation, such as opening the image being clicked in WeChat.

Step S214, detecting whether the click position is located in a keyboard area of the input view.

When the click position is detected to be located within the input view, the click event may be for the input method. However, the operation for the input method may be aft operation to adjust the input view (virtual keyboard), or may be an operation for the keyboard of the input view. In particular, the input view may be divided into a keyboard area and a tool area, etc. The keyboard area may include buttons such as letters, numbers, and punctuation marks, etc. The tool area may include a toolbar of the input method, which may be used for selecting corresponding tools, such as setting skin, sending images, and switching the keyboard, etc.

Thus, whether the click position is located within the keyboard area of the input view may have to be detected. That is, whether the click position falls within the keyboard area of the input view may have to be detected.

When the click position is detected to fall inside the keyboard area of the input view, i.e. the click position is located inside the keyboard area of the input view, Step S216 will be performed. When the click position is detected to fall outside the keyboard area of the input view, i.e. the click position is located outside the keyboard area of the input view, Step S218 will be performed.

Step S216, dispatching the click event to the keyboard of the input view.

When the click position is located within the keyboard area of the input view, the click event may not be an instruction to adjust the keyboard. Accordingly, the click event may be dispatched to the keyboard of the input view, and the keyboard may perform the corresponding functions, such as inputting corresponding text, and characters, etc., thereby enabling the rapid input by the user in the floating keyboard mode.

Step S218, when the click event satisfies a preset condition, adjusting at least one of a drawing position and a drawing size of the input view based on the keyboard adjustment instruction.

When the click position is located in a non-keyboard region of the input view, for example, in the toolbar of the input view, then the click event may be a keyboard adjustment instruction or may be for another item in the tool region. Thus, whether the click event satisfies the preset condition may have to be further detected. When the click position is located in the non-keyboard region of the input view and, meanwhile, satisfies the preset condition, the click even may be considered as the keyboard adjustment instruction, based on which the input view may be adjusted accordingly. When the click position is located in the non-keyboard region of the input view but does not satisfy the preset condition, the click event may be dispatched to the toolbar to call a corresponding tool. In particular, the preset condition may be configured to trigger the keyboard adjustment event, such that an adjustment of the input view may be realized.

In the disclosed embodiment, when the click position is located in the non-keyboard region of the input view, and the click even is the keyboard adjustment instruction, the method may further comprise the following. When the input window is in an editing state and the click position is located within a candidate display area of the input view, whether a moving angle of the click event is located within a preset angle range may be detected. When the moving angle of the click event is located within the preset angle range, the client event may be considered as the keyboard adjustment instruction.

In fact, no matter the input method is in the floating keyboard mode or the normal mode, a normal input may be realized. That is, when the input window is in the editing state, however, in the editing state the tool area may be switched to be a candidate display region and the corresponding operation for the candidate display region may include selecting on-screen words and other editing. Thus, when the input window is in the editing state, and the click position is within the range of the tool area of the input view, the position, and the moving angle, and other information of the click event may be detected. When the click position is located on a certain candidate, the click event may be configured to select the candidate, and the input method may select the candidate to be on the screen.

When the click event is moving within the candidate region or at the frame of the candidate region at a certain angle, whether the moving angle is within a predetermined angle range, for example, a range of 0 to 60 degrees, may be detected. When the moving angle is detected to be within the predetermined angle range, the click event may be considered as the keyboard adjustment instruction.

In particular, the adjustment of the input view may be triggered according to the click event, in which the adjustment may include at least one of a position adjustment and a size adjustment. Accordingly, the preset condition may include a first preset condition and a second preset condition, in which the client event satisfying the first preset condition may trigger a position adjustment instruction, and the client event satisfying the second preset condition may trigger a size adjustment instruction. For example, in practice, the first preset condition for triggering the position adjustment instruction may include clicking a drag button in the tool area and other triggering methods. The second preset condition for triggering the size adjustment instruction may include a long tapping (i.e., a click lasting over a certain time period, such as 2 seconds), double-click or multi-click or other operations to trigger the tool area, or click, double-click or multi-click or other operations to trigger the border of the virtual keyboard border, based on which a size adjustment mask may be activated for realizing the size adjustment. In particular, the adjustment may be based on the starting point, the middle point, and the end point, and other tracking points of the user's touch. According to the direction and the displacement between the points, the position adjustment and size adjustment may be realized. In particular, operations disclosed in the following embodiments may be employed.

(1) Adjusting the Drawing Position of the Input View

Based on the keyboard adjustment instruction, adjusting the drawing position of the input view in the input window may comprise the following. When the click event satisfies the first preset condition, the keyboard adjustment instruction may be the position adjustment instruction. Track information may be acquired based on the click event. The drawing position of the input view in the input window may be adjusted according to the track information.

When the click event satisfies the first preset condition, the keyboard adjustment instruction may be the position adjustment instruction. That is, the drawing position of the input view in the floating keyboard mode may be adjusted. The user's initial click event may trigger an event for adjusting the drawing position. Then according to his/her requirements, the user may click and move a certain trajectory to move the input view by dragging. At this moment, the track information of the movement of the click event may be recorded in real time, and based on the track information, the drawing position of the input view inside the input window may be adjusted in real time.

For example, the click position on the toolbar when the click event occurs may be recorded, such as the distance from each side of the input view, such that based on the track information of the movement of the click event, each side of the input view and each key in the input view may be moved (drawn). Further, when adjusting the drawing position of the input view inside the input window, m edge detection may have to be performed. That is, during the movement, the position of the edge mark, such as each side or each vertex of the input view, may not exceed the input window. That is, the input view may not be moved out of the display range of the screen.

(2) Adjusting the Drawing Size of the Input View

Based on the keyboard adjustment instruction, adjusting the drawing size of the input view inside the input window may comprise the following. When the click event satisfies the second preset condition, the keyboard adjustment instruction may be a size adjustment instruction. A size adjustment mask may be activated. An adjustment vector of the input view may be determined, and based on the adjustment vector, the size adjustment mask of the input view may be adjusted. In particular, determining the adjustment vector of the input view may comprise the following steps: obtaining the adjusted drawing size according to the click event, and calculating the adjustment vector according to the adjusted drawing size and the preset size of the input view; or obtaining an adjustment angle according to the click event, and determining the adjustment vector according to the adjustment angle.

When the click event satisfies the second preset condition, the keyboard adjustment instruction may be the size adjustment instruction. For example, the user may click the border of tire input view to adjust the size of the input view in the floating keyboard mode. When the keyboard adjustment instruction is determined as a keyboard adjustment instruction for adjusting the drawing size of the input view, the size adjustment mask of the input view may be activated. In particular, the size adjustment mask may refer to the border of the input view, inside which the virtual keyboard may be disposed. Through adjusting the size adjustment mask, the border of the input view may be adjusted, thereby adjusting the drawing size of the input view.

When adjusting the drawing size of the input view, the user may move any side of the input view, or move the input view according to a certain adjustment angle. The adjustment angle or the adjusted drawing size may be obtained according to the click event, thereby determining the adjustment vector. In particular, when the adjustment angle is obtained, the adjustment vector may be determined according to the adjustment angle and the moving direction of the adjustment angle. When the adjusted drawing size is obtained, the adjustment vector may be calculated according to the adjusted drawing size and the preset size of the input view. Then each area inside the input view may be adjusted according to the adjustment vector. That is, based on the angle and the size of the adjustment vector, the drawing size of the size adjustment mask may be adjusted and, accordingly, the size of the input view may be adjusted.

For example, the user may trigger the size adjustment mask by triggering the toolbar area of the input view through long pressing and other triggering methods. The user may adjust the border of the size adjustment mask by dragging, during which the adjustment angle of the movement or adjusted drawing size may be obtained in real time, thereby adjusting the input view in real time and drawing the adjusted input view.

Moreover, after the size adjustment mask is triggered, the position adjustment instruction may be triggered by the click event, which is corresponding to a position adjustment button on the size adjustment mask. Thus, the drawing position of the input view may be adjusted by clicking the position adjustment button and moving the input view.

In the disclosed embodiment, the background transparency of the input view is adjusted, and/or when the click event is not dispatched to the input view over a predetermined time period, the input view may be collapsed, and an icon which replaces the input view may be displayed. In response to receiving a trigger instruction for the icon, the input view may be expanded.

Because the position and size of the input view may be adjusted as desired in the screen, the information of other current applications may be blocked. To avoid such a situation, the background transparency of the input view may be adjusted. For example, the transparency may be adjusted to translucency or other transparency (such as 80% transparency) or full transparency, such that the user may be able to see the information of other applications through the keyboard.

When the user has not used the input method for a long time, the floating keyboard may also be collapsed. That is, when the click event is not dispatched to the input view over the predetermined time period, the input view may be collapsed, then an icon may be drawn to replace the input view and displayed in the input window. When the user wants to start inputting, the user may click the icon, such that in response to receiving a triggering instruction for the icon, the input view may be expanded to facilitate the user's input.

Step S220, receiving a floating-keyboard terminating instruction.

Step S222, exiting the floating keyboard mode: according to the floating-keyboard terminating instruction, adjusting the input window and the input view back to the original size and the original position, and restoring the background color of the input window.

When completing the input or no longer requiring the floating keyboard, the user may send the floating-keyboard terminating instruction for exiting the floating keyboard mode. In response to receiving the floating-keyboard terminating instruction, the input method may exit the floating keyboard mode. That is, according to the floating-keyboard terminating instruction, the input window and the input view may be adjusted from the preset size to the original size, and from the current position to the original position. That is, the original size and the original position of the input window in the normal mode may be restored, and the original size and the original position of the input view inside the input window with the original size may also be restored. For example, the input view and the input window may have the same original size. Further, the background color of the input window, and the skin of the input window in the normal mode, etc. may also be restored.

In particular, the floating-keyboard terminating instruction may be triggered by certain keys, certain key combinations, and other shortcut keys, or may be triggered by dragging the virtual keyboard to the lower part of the screen. That is, the input view may be dragged to the lower part of the input window, such that the floating-keyboard terminating instruction may be triggered and, accordingly, the input method may be automatically switched back to the normal mode from the floating keyboard mode.

In summary, through intercepting the click event on the touchscreen by the user, detecting and dispatching the click event to the corresponding application program, the user may be able to operate the applications other than the input method in the floating keyboard mode and, meanwhile, the input method may allow the user to input normally, and the size of the input view may be adjusted. The input efficiency may be improved without affecting the user and, accordingly, the user experience may be improved.

Moreover, the background transparency of the input view may be adjusted. When the click event is not dispatched to the input view over the predetermined time period, the input view may be collapsed, and the icon replacing the input view may be displayed. In response to receiving the trigger instruction for the icon, the input view may fee expanded to facilitate the user's input. Thus, the information of other applications may not be blocked, and the user may not be disturbed.

Third Embodiment

Based on the above-mentioned embodiment, the present embodiment describes a method for adjusting an input virtual keyboard by taking a virtual keyboard as an example.

Figure 3:
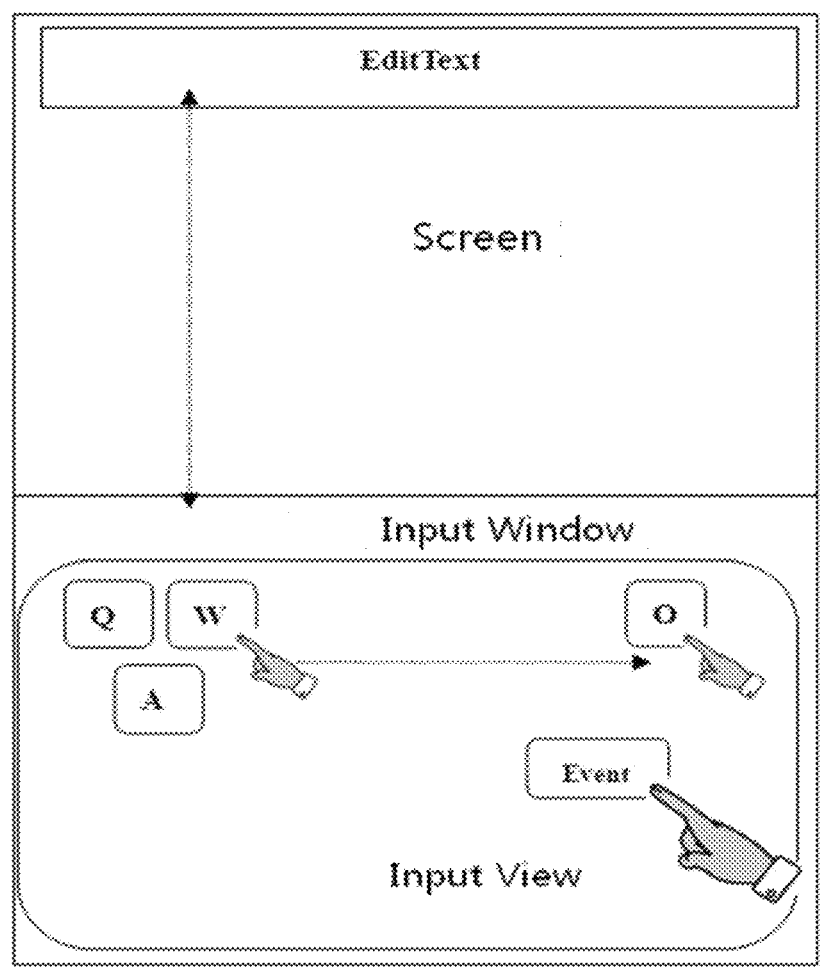
FIG. 3 illustrates a schematic diagram of an exemplary input window in a normal mode according to a third embodiment of the present disclosure.

FIG. 3 illustrates an exemplary input window which is in a normal mode, in response to receiving the keyboard floating instruction from the user, the floating keyboard mode may be started.

The width and height of the input window may be configured to be the width and height of the screen, respectively. When the input window has a background color, the background color may be configured to be transparent. In particular, when configuring the size of the input window to be the screen size and taking the system's compatibility into account, the width and the height, instead of the coordinates, may be adopted to identify the screen size, thereby realizing the floating effect of the input window in the subsequent process. The compatibility may refer to that in certain terminal systems, the input widow may be configured to only be located at the lower part of the screen. Thus, when configuring the size of the input window, the coordinates of the input window may have to be neglected. Then the size of the input window may be adjusted to the preset size, for example, reduced to the preset size.

At this moment, the input method may enter the floating keyboard mode, in which the position of the input view may be adjusted by adjusting the position (x, y) of the input view inside the input window, thereby realizing the visually floating effect of the input window.

In the floating keyboard mode, the user may be able to input through clicking, adjust the input view, or operate other current applications.

A dispatcher event may be created. When the user clicks the screen, a click event may be generated and detected. According to the detection result, whether the application to execute the click event is the input method or other applications may be determined.

Figure 4:
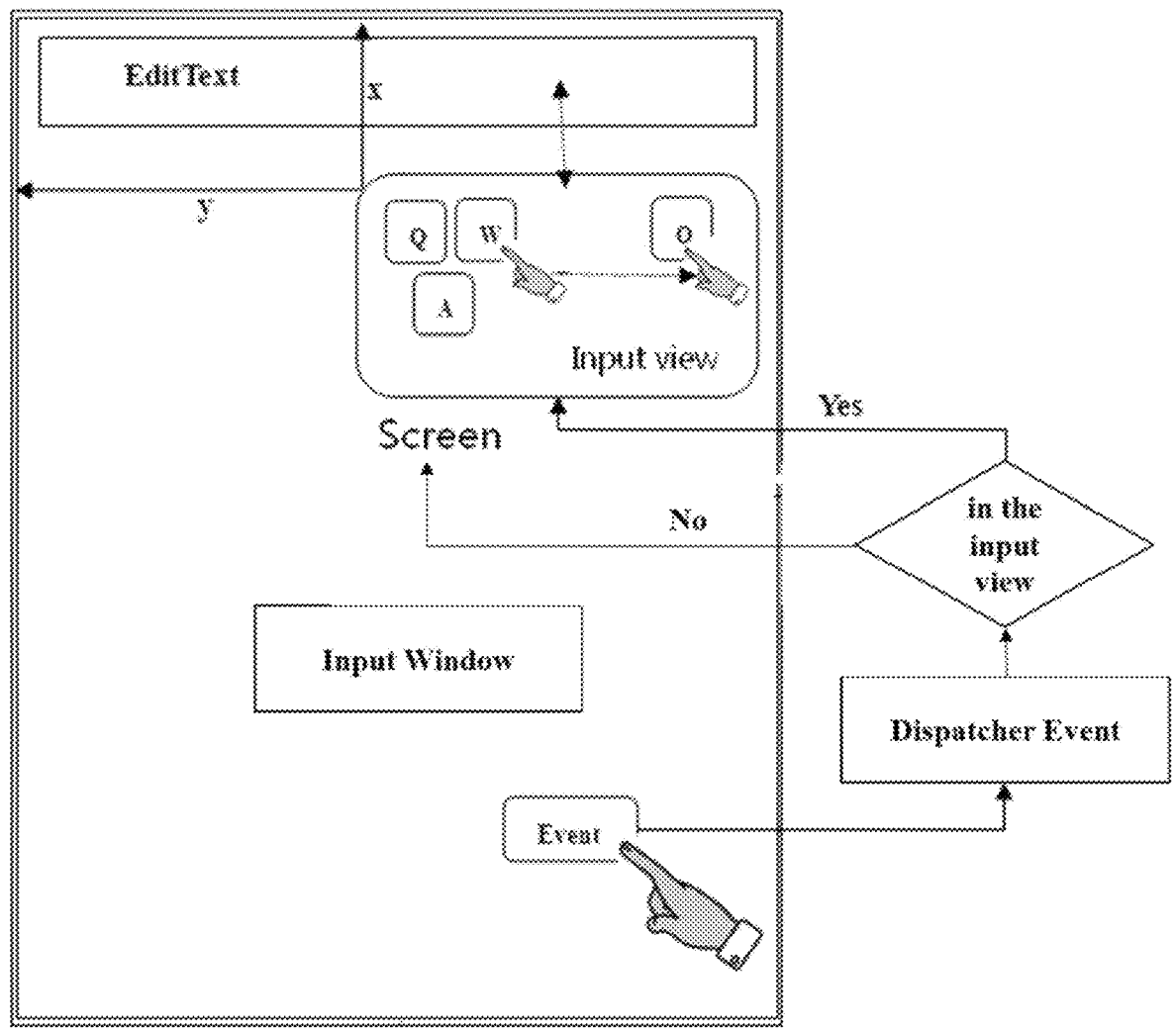
FIG. 4 illustrates a schematic diagram of an exemplary input window in a floating keyboard mode according to a third embodiment of the present disclosure.

In particular, as shown in FIG. 4, when the coordinates (x, y) of the click position of the click event satisfy the following condition, the event dispatcher may dispatch the click event to the input view, otherwise the event dispatcher may dispatch the click event to other applications:

Input View.x≤Event.x≤Input View.x+Input View.width

Input View.y≤Event.y≤Input View.y+Input View.height, where Event.x is the horizontal coordinate of the event, Event.y is the vertical coordinate of the event, Input View.x is the horizontal coordinate of the input view, Input View. y is the vertical coordinate of the input view, Input View.width is the width of the input view, and Input View.height is the height of the input view. As shown in FIG. 4, the input window filling the entire screen may include: a closed region occupied by the input view, and a remaining region other than the closed region.

When the above condition is satisfied, the click event may be dispatched to the input view. In response to receiving the click event, the input view may determine the current click position in the input view according to the coordinates of the click position the click event, and submit the determined click position to the corresponding key button for processing or adjust the drawing size and drawing position of the input view. That is, in the floating keyboard mode, the size and position adjustment of the input view may be triggered by the click event.

Figure 5:
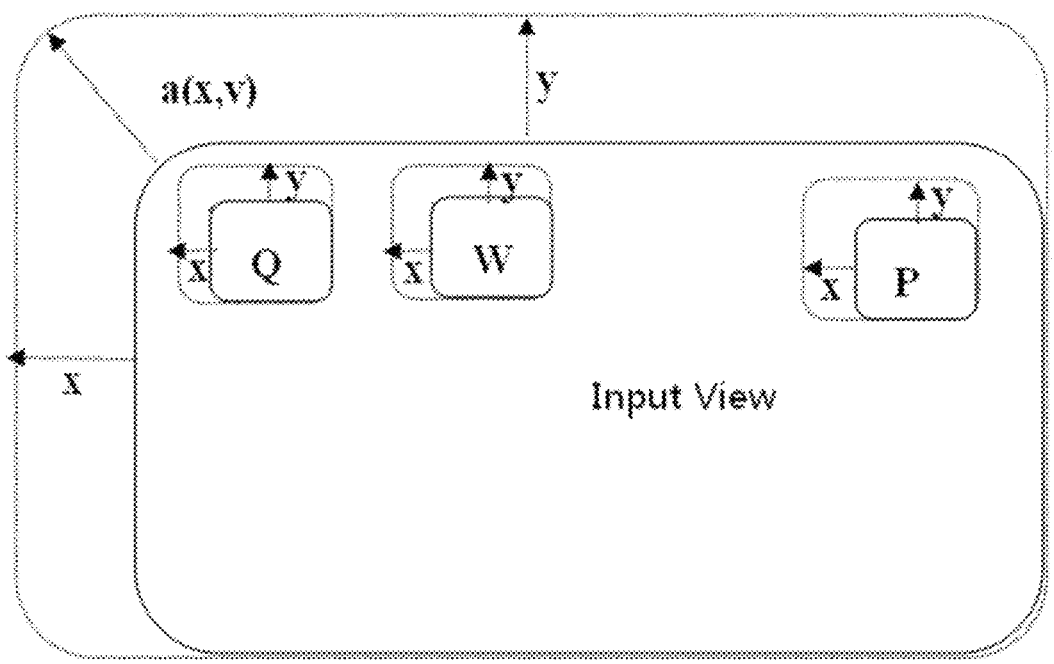
FIG. 5 illustrates a schematic diagram of adjusting a size of an input view when an input window is in a floating keyboard mode according to a third embodiment of the present disclosure.

FIG. 5 illustrates a schematic diagram of adjusting the size of the input view.

The input view may contain a variety of elements, such as a candidate area, a keyboard, and a tool area, etc. The preset size in the floating keyboard mode, i.e., the width $W_{standard}$ and height $H_{standard}$ of the input view, and the width $W_{sub\text{-}standard}$ and height $H_{sub\text{-}standard}$ of a sub-element, may be pre-determined. When adjusting the size of the input view, based on the size adjustment mask, the desired width $W_{adjust}$ and height $H_{adjust}$ of the input view after being adjusted may be obtained in real time. Then the adjustment vector may be a(x, y)=$(W_{adjust}, H_{adjust})/(W_{standard}, H_{standard})$.

In particular, in the adjustment vector a(x, y), x in positive/negative value and y in positive/negative value may represent different adjustment directions. For example, x>0 may represent an adjustment to the right, x<0 may represent an adjustment to the left, y>0 may represent an adjustment to the top, and y<0 may represent an adjustment to the bottom.

When the adjustment vector is obtained, the input view and all sub-elements may be resized according to the adjustment vector a(x, y), thereby realizing the size adjustment of the input view. The width and height of the sub-element after being adjusted is $(W_{sub\text{-}adjust}, H_{sub\text{-}adjust})=W_{sub\text{-}standard}, H_{sub\text{-}standard})*a(x, y)$.

Similar to the above-mentioned size adjustment of the input view, when the position of the input view is adjusted, the initial coordinates of the click position in the input view may be obtained. Thus, after the coordinates of the corresponding movement track of the click event are obtained in real time, the position of the input view inside the input window may be adjusted according to the movement vector between the coordinates of the corresponding movement track of the click event and the coordinates of the click position Thus, through the disclosed method for adjusting the input virtual keyboard, the position of the input view may be no longer limited to the lower part of the screen of the terminal, instead, may be adjusted as desired by the user. That is, the input view on the touchscreen of the terminal may be dragged to a desired position within the touchscreen, thereby realizing a floating effect of the input view. Moreover, the width and height of the virtual keyboard may be adjusted as desired to achieve a mini-keyboard, such that the one-hand operation of the large-sized screen terminal may be realized.

It should be noted that, the foregoing method embodiment is expressed as a series of action combinations for the purpose of brief description, but those skilled in the art should know that the present disclosure is not limited to the described action sequence, because some steps may be performed in another sequence or simultaneously according to the present invention. Besides, those skilled in the art should also understand that the embodiments described in the specification are exemplary embodiments, and the involved actions are not mandatory in the embodiments of the present disclosure.

Fourth Embodiment

The present disclosure further provides an input apparatus.

Figure 6:
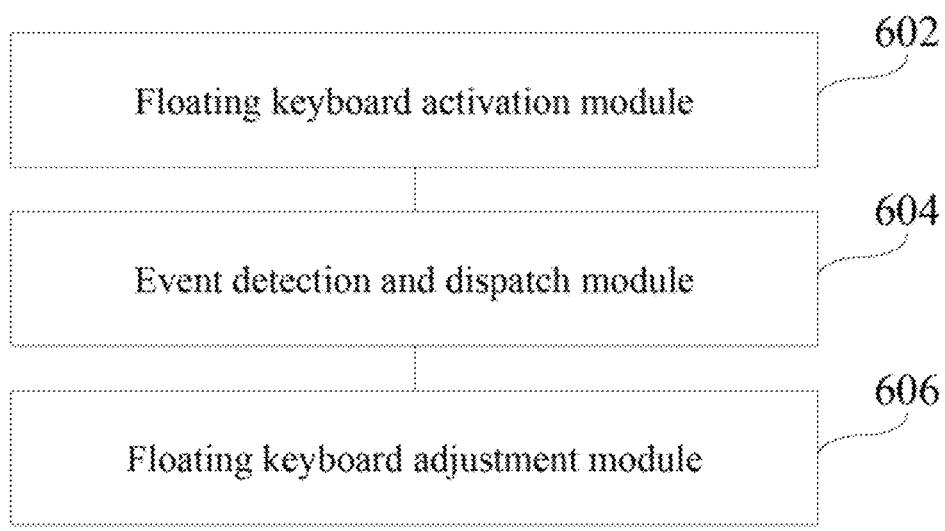
FIG. 6 illustrates a block diagram of an exemplary input apparatus consistent with disclosed embodiments.

FIG. 6 illustrates a block diagram of an exemplary input apparatus consistent with disclosed embodiments. As shown in FIG. 6, the input apparatus may comprise: a floating keyboard activation module 602, an event detection and dispatch module 604, and a floating keyboard adjustment module 606.

In particular, the floating keyboard activation module 602 may be configured to, based on a received keyboard floating instruction, adjust a size of an input window to a screen size.

The event detection and dispatch module 604 may be configured to intercept a click event performed on a touchscreen by a user and detect the click event. The floating keyboard adjustment module 606 may be configured to, when the click event is detected as a keyboard adjustment instruction, based on the keyboard adjustment instruction, adjust at least one of a drawing position and a drawing size of an input view, wherein the input view may be a region for drawing the input virtual keyboard inside the input window.

In summary, according to the received keyboard floating instruction, the size of an input window may be adjusted to the screen size, and the background color of the input window may be configured to be transparent. Because the entire screen region is the input window, the input view for drawing the virtual keyboard may float in the input window, and the position and size of the input view may be adjusted as desired. Thus, the drawing position and drawing size of the input view may be adjusted according to the received keyboard floating instruction. That is, the position and the size of the input view may be adjusted as desired, thereby facilitating one-hand operation by the user, realizing the rapid input, and improving the input efficiency.

Fifth Embodiment

Figure 7:
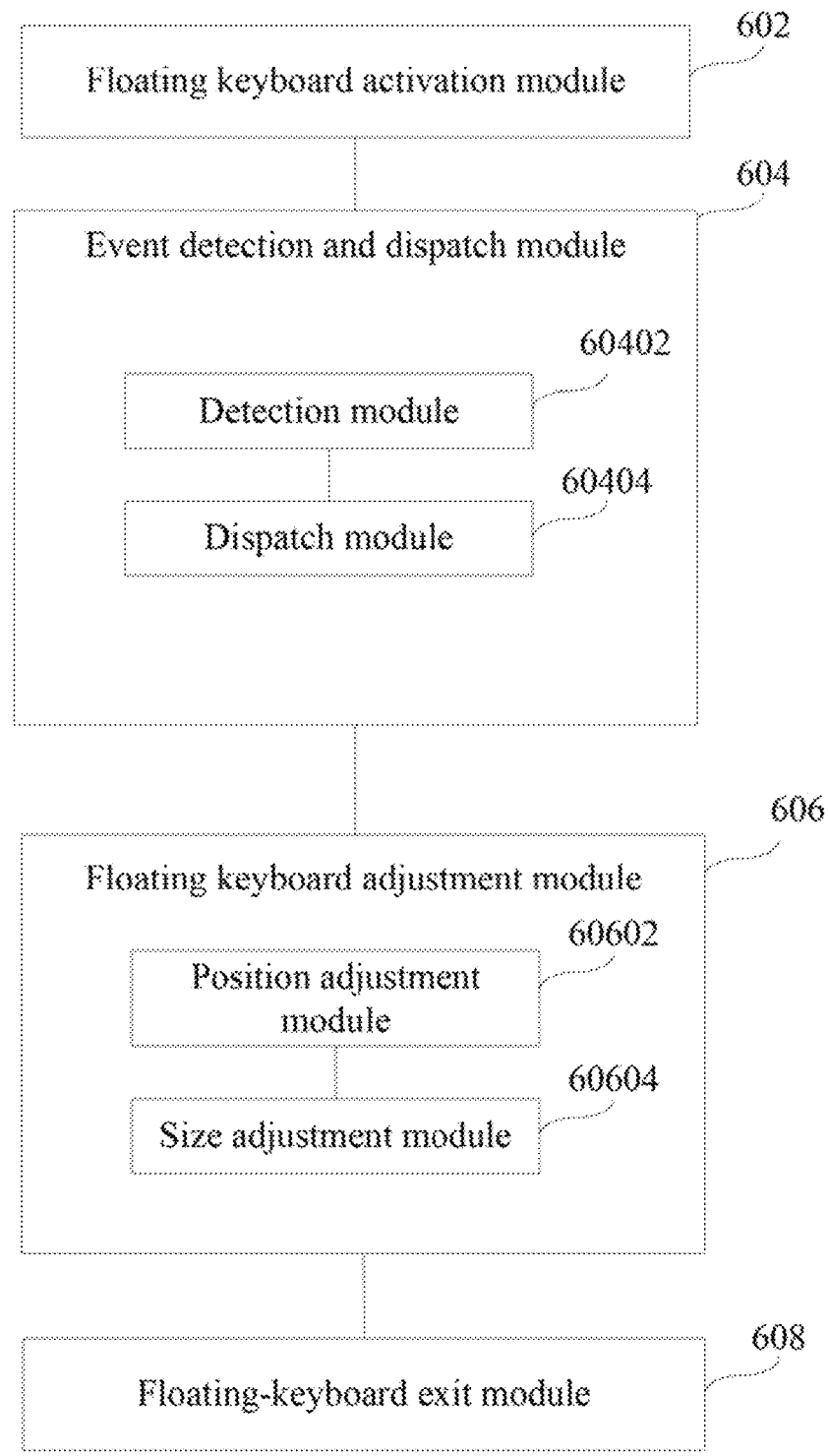
FIG. 7 illustrates a block diagram of another exemplary input apparatus consistent with disclosed embodiments.

FIG. 7 illustrates a block diagram of another exemplary input apparatus consistent with disclosed embodiments. As shown in FIG. 7, the input apparatus may comprise the following modules.

The floating keyboard activation module 602 may be further configured to configure the background color of the input window to be transparent, adjust the drawing position of the input view to a preset position within the input window, and adjust the drawing size of the input view to a preset size.

The event detection and dispatch module 604 may further include a detection module 60402 and a dispatch module 60404.

The detection module 60402 may be configured to obtain the position information of the click in the click event, and detect whether the click position is located within the input view. The detection module 60402 may also be configured to, in response to detecting that the click position is located within the input view; according to the click position, detect whether the click event is the keyboard floating instruction. The dispatch module 60404 may be configured to, when the click position is detected to be located outside the input view, dispatch the click event to the current application where the input method is embedded.

The detection module 60402 may be further configured to detect the click position inside the input view. When the click position is detected to be located in a non-keyboard area of the input view and the click event satisfies a preset condition, the click event may be determined to be the keyboard floating instruction. The dispatch module 60404 may be configured to, when the click position is detected to be located in the keyboard area of the input view, dispatch the click event to the keyboard area of the input view.

The dispatch module 60404 may be further configured to, when the input window is in an editing state and the click position is located within a candidate display area of the input view, detect whether the moving information of an angle (i.e., moving angle) of the click event is located within a preset angle range. In particular, when the moving angle of the click event is located within the preset angle range, the client event may be determined to be the keyboard adjustment instruction.

Further, the preset condition may include a first preset condition and a second preset condition. The floating keyboard adjustment module 606 may further include: a position adjustment module 60602 and a size adjustment module 60604.

In particular, when the click event satisfies the first preset condition, the keyboard adjustment instruction may be determined to be a position adjustment instruction. The position adjustment module 60602 may be configured to acquire track information based on the click event, and adjust the drawing position of the input view in the input window based on the track information.

When the click event satisfies the second preset condition, the keyboard adjustment instruction may be determined to be a size adjustment instruction. The size adjustment module 60604 may be configured to activate a size adjustment mask, determine an adjustment vector of the input view, and adjust each area of the input view based on the adjustment vector.

The size adjustment module 60604 may be further configured to obtain an adjusted drawing size based on the click event, and calculate the adjustment vector based on the adjusted drawing size and the preset size of the input view; or obtain an adjustment angle based on the click event, and determine the adjustment vector based on the adjustment angle.

A floating-keyboard exit module 608, may be configured to, receive a floating-keyboard terminating instruction; according to the floating end instruction, adjust, the input window and the input view back to the original size and the original position; and restore the background color of the input window.

The keyboard adjustment module 604 may be further configured to, adjust the background transparency of the input view and/or when the click event is not dispatched to the input view over the predetermined time period, collapse the input view, replace the input view with an icon, and display the icon. The keyboard adjustment module 604 may be further configured to expand the input view in response to receiving a trigger instruction for the icon.

In summary, through intercepting the click event on the touchscreen by the user, detecting and dispatching the click event to the corresponding application program, the user may be able to operate the applications other than the input method in the floating keyboard mode and, meanwhile, the user may be able to utilize the input method normally, and the size of the input view may be adjusted. The input efficiency may be improved without affecting the user and, accordingly, the user experience may be improved.

Moreover, the background transparency of the input view may be adjusted. When the click event is not dispatched to the input view beyond the predetermined time period, the input view may be collapsed, and the icon may replace the input view and may be displayed. In response to receiving the trigger instruction for the icon, the input view may be expanded to facilitate the user's input. Thus, the information of other applications may not be blocked, and the user may not be disturbed.

Because the device embodiment is substantially similar to the method embodiment, the description is relatively simple, and the same and similar parts may be referred to the description of the method embodiments.

Various embodiments of the present specification are described in a progressive manner, in which each embodiment focusing on aspects different from other embodiments, and the same and similar parts of each embodiment may be referred to each other.

It should be appreciated by those skilled in this art that the embodiments of this disclosure may be provided in the form of a method, system or computer program product. Therefore, the embodiments of this disclosure may be realized by complete hardware embodiments, complete software embodiments, or software-hardware combined embodiments. Moreover, this disclosure may be realized in the form of a computer program product that is applied to one or more computer-usable storage mediums (including, but not limited to disk memory, CD-ROM or optical memory) in which computer-usable program codes are contained.

This disclosure is illustrated with reference to the flow chart and/or the block diagrams of the method, device (system) and computer program product according to the embodiments of this disclosure. It should be appreciated that each flow in the flow chart and/or each block in the block diagram, and/or the combination of the flows in the flow chart and the blocks in the block diagram may be realized by computer program instructions. These computer program instructions may be provided to a general-purpose computer, a special purpose computer, an embedded processor or processors of other programmable data processing devices to generate a machine which makes the instructions executed by the processors of the computers or the processors of other programmable data processing devices generate a device for realizing the functions specified in one or more flows of the flow chart or one or more blocks in the block diagram.

These computer program instructions may also be stored in a computer-readable memory which is capable of guiding a computer or another programmable data processing device to work in a given manner, thereby enabling the instructions stored in the computer-readable memory to generate a product, including an instruction device for realizing the functions specified in one or more flows of the flow chart or one or more blocks in the block diagram.

These computer program instructions may also be loaded to a computer or other programmable data processing devices to execute a series of operations thereon to generate the processing realized by the computer so that the instructions executed by the computer or other programmable data processing devices offer the steps for realizing the functions specified in one or more flows of the flow chart or one or more blocks in the block diagram.

While preferred embodiments have been described herein, variations and modifications may be made on these embodiments once those skilled in the art know the basic creative concept of tins disclosure. Thus, the accompanying claims is intended to cover the preferred embodiments and all the variations and modifications that fall within the scope of this disclosure.

Figure 8:
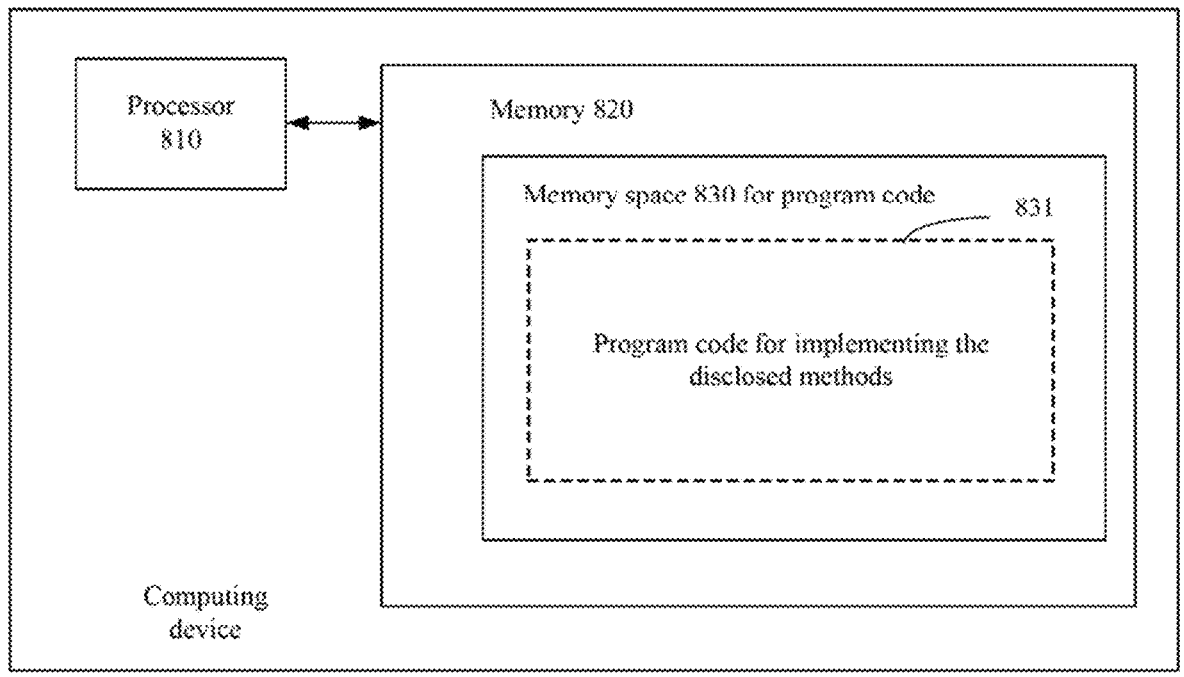
FIG. 8 illustrates a block diagram of an exemplary computing device for executing a method for adjusting an input virtual keyboard consistent with disclosed embodiments.
Figure 9:
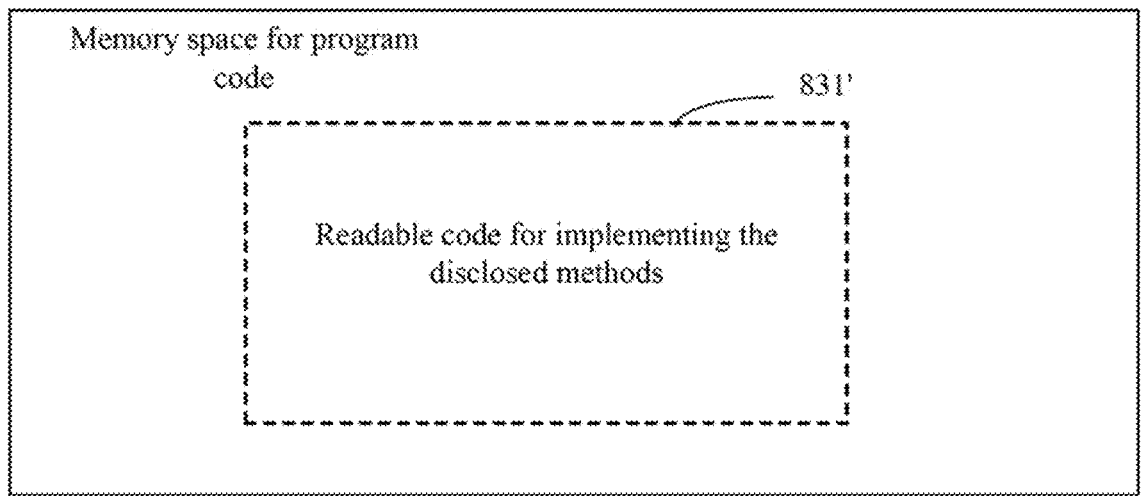
FIG. 9 illustrates an exemplary memory unit for keeping or carrying a program for executing a method for adjusting an input virtual keyboard consistent with disclosed embodiments.

For example, FIG. 8 illustrates a block diagram of an exemplary computing device for executing an exemplary method for adjusting an input virtual key board consistent with disclosed embodiments. The computing device may comprise a processor 810, and a program product or a readable medium existing in the form of a memory 820. The memory 820 may include an electronic memory, such as flash memory, electrically erasable programmable read only memory (EEPROM), erasable programmable read-only memory (EPROM), and read-only memory (ROM), etc. The memory 820 may include a memory space 830 for a program code 831 which performs any of the disclosed methods. For example, the memory space 830 for the program code may include the program code 831 for implementing each step in the above-disclosed methods. The program code may be read from or written to one or more program products. The program products may include program code carriers such as memory cards. Such a program product is typically a portable or fixed storage unit as illustrated in FIG. 9. The memory unit may have a memory segment and a memory space arranged similarly to the memory 820 in the computing device shown in FIG. 8. The program code may be compressed, for example, in any appropriate form. The storage unit may often include a readable code 831, i.e., a code which is readable by, for example, the processor 810. When the code is executed by the computing device, computing device may execute each step in the disclosed methods.

Finally, it should be noted that, in the present disclosure, relational terms such as first and second, and the like, may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not without more constraints, preclude the existence of additional identical elements in the process, method, article, or apparatus that comprises the element.

The present disclosure provides a detailed description of a method for adjusting an input virtual keyboard and an input apparatus. Several examples are used for illustration of the principle and implementation manner of the present disclosure. The description of the preceding embodiments is only used to help understand the method and its core ideas in the present disclosure. Meanwhile, those skilled in the art can make variations to the specific implementation manner and application scope according to the ideas of the present disclosure. In conclusion, the content of this specification should not be construed as a limitation to the present disclosure.

What is claimed is:

1. A method for adjusting an input virtual keyboard, comprising:

based on a received keyboard floating instruction, adjusting, by a computing device, a size of an input window of an input method to a screen size that fills an entire touchscreen of the computing device, wherein the input window becomes a full-screen input window located at a top layer of all currently displayed windows on the computing device, the input window includes an area drawn with the input virtual keyboard, and the area drawn with the input virtual keyboard is referred as an input view;

separating the full-screen input window of the input method and the input view presenting the input virtual keyboard, including: configuring a background color of the full-screen input window to be transparent, wherein the input view occupies a closed region of the full-screen input window and presents the input virtual keyboard with a floating effect, and a remaining region of the full-screen input window other than the closed region allows content of at least one currently displayed window corresponding to a running application other than the input method and located at a layer lower than the full-screen input window to be shown;

intercepting a click event performed in the full-screen input window of the input method on the touchscreen by a user and detecting the click event, wherein the click event performed at any location on the touch screen is a click event performed inside the input window;

acquiring position information of a click in the click event, and detecting whether a click position is located in the input view directed to the input method or outside the input view directed to the running application other than the input method;

when the click position is detected to be located outside the input view, dispatching the click event to the running application where the input method is currently embedded;

when the click position is detected to be located inside the input view:

when the click position is located within a keyboard area of the input view, dispatching the click event to the keyboard area of the input view;

when the click position is located within a non-keyboard area of the input view and the input window is in an editing state, detecting whether a moving angle of the click event is located within a preset angle range;

when the moving angle of the click event is located within the preset angle range, determining that the client event is a keyboard adjustment instruction; and when the click event is detected as the keyboard adjustment instruction, based on the keyboard adjustment instruction, adjusting at least one of a drawing position and a drawing size of the input view.

2. The method according to claim 1, wherein separating the input window corresponding to the input method and the input view presenting the input virtual keyboard includes:

adjusting the drawing position of the input view to a preset position inside the input window, and adjusting the drawing size of the input view to a preset size.

3. The method according to claim 1, wherein the preset condition includes a first preset condition, and based on the keyboard adjustment instruction, adjusting a drawing position of an input view further includes:

when the click event satisfies the first preset condition, determining the keyboard adjustment instruction to be a position adjustment instruction, and based on the click event, acquiring track information; and based on the track information, adjusting the drawing position of the input view inside the input window.

4. The method according to claim 1, wherein the preset condition includes a second preset condition, and based on the keyboard adjustment instruction, adjusting a drawing size of an input view further includes:

when the click event satisfies the second preset condition, determining the keyboard adjustment instruction to be a size adjustment instruction, and activating a size adjustment mask; and determining an adjustment vector of the input view, and based on the adjustment vector, adjusting the drawing size of the input view inside the input window.

5. The method according to claim 4, wherein determining an adjustment vector of the input view further includes:

based on the click event, obtaining an adjusted drawing size, and based on the adjusted drawing size and a preset size of the input view, calculating the adjustment vector; or based on the click event, obtaining an adjustment angle, and based on the adjustment angle, determining the adjustment vector.

6. The method according to claim 2, further including:
receiving a floating-keyboard terminating instruction; and
based on the floating-keyboard terminating instruction, adjusting the input window and the input view back to an original size and an original position; and
restoring the background color of the input window.

7. The method according to claim 1, further including at least one of the following:

adjusting a background transparency of the input window;

upon determining that no click event is dispatched to the input view over a preset time duration, collapsing the input view, replacing the input view with an icon, and displaying the icon; and in response to receiving a trigger instruction for the icon, expanding the input view.

8. The method according to claim 1, wherein detecting whether a click position is located in the input view directed to the input method or outside the input view directed to the running application other than the input method comprises:

determining that the click position is located inside the input view upon determining that a click position of the click event satisfy the following conditions:

Input View.$x \leq$ Event.$x \leq$ Input View.$x$+Input View.width,

Input View.$y \leq$ Event.$y \leq$ Input View.$y$+Input View.height, wherein Event.x is a horizontal coordinate of the click event, Event.y is a vertical coordinate of the click event, Input View.x is a horizontal coordinate of the input view, Input View. y is a vertical coordinate of the input view, Input View.width is a width of the input view, and Input View.height is a height of the input view.

9. An input apparatus, comprising at least one processor and a touchscreen, the at least one processor being configured for:

based on a received keyboard floating instruction, adjusting a size of an input window of an input method to a screen size that fills an entire touchscreen of the computing device, wherein the input window becomes a full-screen input window located at a top layer of all currently displayed windows on the computing device, the input window includes an area drawn with the input virtual keyboard, and the area drawn with the input virtual keyboard is referred as an input view;

separating the full-screen input window of the input method and the input view presenting the input virtual keyboard, including: configuring a background color of the full-screen input window to be transparent, wherein the input view occupies a closed region of the full-screen input window and presents the input virtual keyboard with a floating effect, and a remaining region of the full-screen input window other than the closed region allows content of at least one currently displayed window corresponding to a running application other than the input method and located at a layer lower than the full-screen input window to be shown;

intercepting a click event performed in the full-screen input window of the input method on the touchscreen by a user and detect the click event, wherein the click event performed at any location on the touch screen is a click event performed inside the input window;

acquiring position information of a click in the click event, and detecting whether a click position is located in the input view directed to the input method or outside the input view directed to the running application other than the input method;

when the click position is detected to be located outside the input view, dispatching the click event to the running application where the input method is currently embedded;

when the click position is detected to be located inside the input view:

when the click position is located within a keyboard area of the input view, dispatching the click event to the keyboard area of the input view;

when the click position is located within a non-keyboard area of the input view and the input window is in an editing state, detecting whether a moving angle of the click event is located within a preset angle range; and when the moving angle of the click event is located within the preset angle range, determining that the client event is a keyboard adjustment instruction; and when the click event is detected as the keyboard adjustment instruction, based on the keyboard adjustment instruction, adjusting at least one of a drawing position and a drawing size of the input view.

10. The input apparatus according to claim 9, wherein the at least one processor is further configured for:

after adjusting the size of the input window to the screen size, based on the keyboard floating instruction, adjusting the drawing position of the input view to a preset position inside the input window, and adjusting the drawing size of the input view to a preset size.

11. The input apparatus according to claim 9, wherein the at least one processor is further configured for performing at least one of the following:

when the preset condition includes a first preset condition and the click event satisfies the first preset condition, determining the keyboard adjustment instruction to be a position adjustment instruction, and based on the click event, acquiring track information; and based on the track information, adjusting the drawing position of the input view inside the input window, and when the preset condition includes a second preset condition and the click event satisfies the second preset condition, determining the keyboard adjustment instruction to be a size adjustment instruction, and activating a size adjustment mask; and determining an adjustment vector of the input view, and based on the adjustment vector, adjusting the drawing size of the input view inside the input window.

12. The input apparatus according to claim 11, wherein the at least one processor is further configured for:

based on the click event, obtaining an adjusted drawing size, and based on the adjusted drawing size and a preset size of the input view, calculating the adjustment vector; or based on the click event, obtaining an adjustment angle, and based on the adjustment angle, determining the adjustment vector.

13. The input apparatus according to claim 10, wherein the at least one processor is further configured for:

receiving a floating-keyboard terminating instruction; and based on the floating-keyboard terminating instruction, adjusting the input window and the input view back to an original size and an original position; and restoring the background color of the input window.

14. The input apparatus according to claim 10, wherein the at least one processor is further configured for performing at least one of the following:

adjusting a background transparency of the input window; and upon determining that no click event is dispatched to the input view over a preset time duration, collapsing the input view, replacing the input view with an icon, and displaying the icon; and in response to receiving a trigger instruction for the icon, expanding the input view.

15. A non-transitory computer-readable medium comprising a readable code, when the readable code is run on the computing device, the computing device executes the method comprising:

based on a received keyboard floating instruction, adjusting a size of an input window of an input method to a screen size that fills an entire touchscreen of the computing device, wherein the input window becomes a full-screen input window located at a top layer of all currently displayed windows on the computing device, the input window includes an area drawn with the input virtual keyboard, and the area drawn with the input virtual keyboard is referred as an input view;

separating the full-screen input window of the input method and the input view presenting the input virtual keyboard, including: configuring a background color of the full-screen input window to be transparent, wherein the input view occupies a closed region of the full-screen input window and presents the input virtual keyboard with a floating effect, and a remaining region of the full-screen input window other than the closed region allows content of at least one currently displayed window corresponding to a running application other than the input method and located at a layer lower than the full-screen input window to be shown;

intercepting a click event performed in the full-screen input window of the input method on the touchscreen by a user and detect the click event, wherein the click event performed at any location on the touch screen is a click event performed inside the input window;

acquiring position information of a click in the click event, and detecting whether a click position is located in the input view directed to the input method or outside the input view directed to the running application other than the input method;

when the click position is detected to be located outside the input view, dispatching the click event to the running application where the input method is currently embedded;

when the click position is detected to be located inside the input view:

when the click position is located within a keyboard area of the input view, dispatching the click event to the keyboard area of the input view;

when the click position is located within a non-keyboard area of the input view and the input window is in an editing state, detecting whether a moving angle of the click event is located within a preset angle range; and when the moving angle of the click event is located within the preset angle range, determining that the client event is a keyboard adjustment instruction; and when the click event is detected as the keyboard adjustment instruction, based on the keyboard adjustment instruction, adjusting at least one of a drawing position and a drawing size of the input view.

* * * * *